(12) United States Patent
Watts

(10) Patent No.: US 10,061,325 B2
(45) Date of Patent: *Aug. 28, 2018

(54) AUTONOMOUS APPROACH AND OBJECT PICKUP

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,648

(22) Filed: Dec. 23, 2016

(65) Prior Publication Data

US 2017/0102711 A1 Apr. 13, 2017

Related U.S. Application Data

(63) Continuation of application No. 14/673,438, filed on Mar. 30, 2015.

(51) Int. Cl.
*G01C 22/00* (2006.01)
*G05D 1/00* (2006.01)
(Continued)

(52) U.S. Cl.
CPC ........... *G05D 1/0268* (2013.01); *B66F 9/063* (2013.01); *B66F 9/0755* (2013.01);
(Continued)

(58) Field of Classification Search
CPC ..... B66F 9/063; B66F 9/0755; G05D 1/0212; G05D 1/0225; G05D 1/0231;
(Continued)

(56) References Cited

U.S. PATENT DOCUMENTS 4,595,331 A 6/1986 Thompson et al.
6,241,453 B1 6/2001 Upmeyer
(Continued)

OTHER PUBLICATIONS

Kelly, et al., "Field and Service Applications—An Infrastructure-Free Automated Guided Vehicle Based on Computer Vision—An Effort to Make an Industrial Robot Vehicle That Can Operate Without Supporting Infrastructure," Sep. 2007, IEEE Robotics & Automation Magazine, pp. 24-34.

*Primary Examiner* — Maceeh Anwari
(74) *Attorney, Agent, or Firm* — McDonnell Boehnen Hulbert & Berghoff LLP

(57) ABSTRACT

An example method includes receiving instructions to pick up an object with one or more lift elements of an autonomous vehicle. Based on a current positioning of the vehicle, the method further includes identifying the object to be picked up and a particular side of the object under which to place the one or more lift elements of the vehicle. The method additionally includes determining an approach path toward the object for the vehicle to follow to place the lift elements of the vehicle under the particular side of the object. The method further includes causing the vehicle to move along the determined approach path toward the object. The method additionally includes determining that the lift elements of the vehicle are placed under the particular side of the object. The method also includes causing the vehicle to lift the object with the lift elements.

20 Claims, 11 Drawing Sheets

(51) Int. Cl.
    *G05D 1/02*       (2006.01)
    *B66F 9/06*       (2006.01)
    *B66F 9/075*     (2006.01)

(52) U.S. Cl.
    CPC ......... *G05D 1/0212* (2013.01); *G05D 1/0225* (2013.01); *G05D 1/0231* (2013.01); *G05D 1/0297* (2013.01); *G05D 2201/0216* (2013.01)

(58) Field of Classification Search
    CPC ......... G05D 1/0297; G05D 2201/0216; G05D 1/0246; G05D 1/0265; G05D 1/027
    USPC .......................................................... 701/24
    See application file for complete search history.

(56) References Cited

U.S. PATENT DOCUMENTS

| | | |
|---|---|---|
| 7,321,305 B2 | 1/2008 | Gollu |
| 8,192,137 B2 | 6/2012 | Ross |
| 8,210,791 B2 | 7/2012 | Chilson et al. |
| 8,561,897 B2 | 10/2013 | Kunzig et al. |
| 8,562,277 B2 | 10/2013 | Criswell |
| 2008/0167817 A1 | 7/2008 | Hessler et al. |
| 2008/0199292 A1 | 8/2008 | Gatteschi |
| 2014/0214258 A1 | 7/2014 | Wong et al. |
| 2014/0277691 A1 | 9/2014 | Jacobus et al. |

AUTONOMOUS APPROACH AND OBJECT PICKUP

CROSS REFERENCE TO RELATED APPLICATION

The present application is a continuation of U.S. patent application Ser. No. 14/673,438 filed on Mar. 30, 2015, the entire contents of which is incorporated herein by reference, as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may provide for final approach and object pickup for an autonomous vehicle local control system of the vehicle may receive control of the vehicle (e.g., from a remote operator) to complete pickup of an object (e.g., a pallet) with one or more lift elements (e.g., forks) on the vehicle. Based on the current position of the vehicle, the object and a side from which to pick up the object may be identified. The vehicle may then be controlled to move along an approach path toward the object. Based on data from one or more sensors on the vehicle, it may be determined that the lift elements of the vehicle are placed under the object. The sensors may include force sensors, contact sensors, distance sensors, and/or other types of sensors. The lift elements on the vehicle may then be raised in order to complete pickup of the object.

In one example, a method is provided that includes receiving, by a control system of an autonomous vehicle, instructions to pick up an object with one or more lift elements of the autonomous vehicle. Based on a current positioning of the autonomous vehicle, the method further includes identifying the object to be picked up and a particular side of the object under which to place the one or more lift elements of the autonomous vehicle. The method additionally includes determining an approach path toward the object for the autonomous vehicle to follow to place the one or more lift elements of the autonomous vehicle under the particular side of the object. The method also includes causing, by the control system, the autonomous vehicle to move along the determined approach path toward the object. The method further includes determining, based on sensor data from at least one sensor on the autonomous vehicle, that the one or more lift elements of the autonomous vehicle are placed under the particular side of the object. The method also includes causing, by the control system, the autonomous vehicle to lift the object with the one or more lift elements.

In another example, an autonomous vehicle is disclosed that includes one or more lift elements positioned on a side of the autonomous vehicle, at least one horizontal force sensor configured to detect a horizontal force in a direction toward the side of the autonomous vehicle, at least one vertical force sensor configured to detect a downward force on the one or more lift elements, and a control system. The control system is configured to cause the autonomous vehicle to move along an approach path toward an object. Based on sensor data from the at least one horizontal force sensor indicating a horizontal force from the object on the autonomous vehicle, the control system is further configured to determine that the one or more lift elements are positioned under the object. The control system is additionally configured to cause the one or more lift elements to raise the object. Based on sensor data from the at least one vertical force sensor indicating a stable downward force from the object on the one or more lift elements, the control system is further configured to determine that the object is lifted off of a ground surface.

In another example, a non-transitory computer readable medium having stored therein instructions, that when executed by a control system of an autonomous vehicle, cause the control system to perform functions is disclosed. The functions include receiving instructions to pick up an object with one or more lift elements of the autonomous vehicle. Based on a current positioning of the autonomous vehicle, the functions further include identifying the object to be picked up and a particular side of the object under which to place the one or more lift elements of the autonomous vehicle. The functions additionally include determining an approach path toward the object for the autonomous vehicle to follow to place the one or more lift elements of the autonomous vehicle under the particular side of the object. The functions also include causing the autonomous vehicle to move along the determined approach path toward the object. The functions additionally include determining that the one or more lift elements of the autonomous vehicle are placed under the particular side of the object. The functions further include causing the autonomous vehicle to lift the object with the one or more lift elements.

In yet another example, a system may include means for receiving instructions to pick up an object with one or more lift elements of the autonomous vehicle. Based on a current positioning of the autonomous vehicle, the system further includes means for identifying the object to be picked up and a particular side of the object under which to place the one or more lift elements of the autonomous vehicle. The system additionally includes means for determining an approach path toward the object for the autonomous vehicle to follow to place the one or more lift elements of the autonomous vehicle under the particular side of the object. The system may also include means for causing the autonomous vehicle to move along the determined approach path toward the object. The system additionally includes means for determining that the one or more lift elements of the autonomous vehicle are placed under the particular side of the object. The system further includes means for causing the autonomous vehicle to lift the object with the one or more lift elements.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
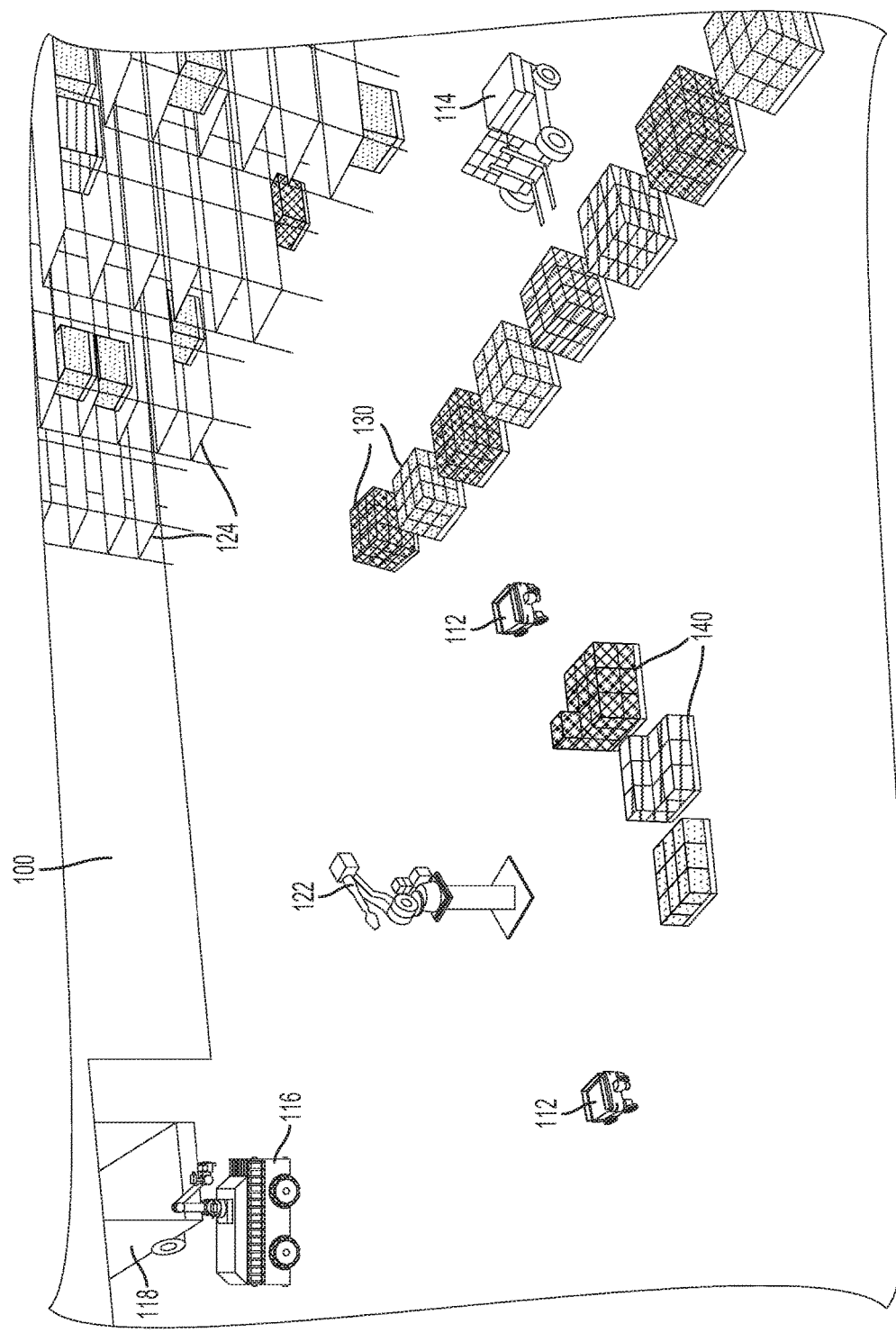
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An autonomous vehicle such as a forklift or a pallet jack may be used to pick up, transport, and place objects, such as pallets of boxes, within an environment such as a warehouse. In some systems, the vehicle may be fully automated and operated by a control system located on the vehicle. In other examples, different levels of remote assistance (e.g., from a remote human operator or a remote automated system) may be used to control or assist operation of the vehicle, ranging from direct remote control (referred to as "teleoperation") to select supervision of certain tasks or functions. Certain types of vehicle operations may be difficult for a remote human operator to control precisely, for instance, due to network delay in communicating with the vehicle, lack of force feedback during interaction with the environment, and/or the inability to experience sensory information (e.g., hearing sounds) from the surrounding environment in real time.

One vehicle task that may be difficult for remote operators involves placement of a vehicle's lift elements under an object in order to pick up the object. For instance, a remote operator may have a difficult time precisely placing a pallet jack's forks under a pallet in order to lift the pallet. In particular, it may be difficult to center the forks under the pallet and fully insert the forks under the pallet without causing a collision with the pallet. Within example systems, a remote operator (e.g., a remote human operator or a remote automated control system) positions an autonomous vehicle close to an object, and then relinquishes control to a local control system of the autonomous vehicle to execute a final approach path to the object in order to pick up the object.

In some examples, the autonomous vehicle may be positioned proximate to an object by a remote operator before a signal is sent to the local control system of the vehicle instructing the vehicle to complete pickup of the object. The local control system of the vehicle may use its current position when the signal is received to identify the object to be picked up as well as a particular side of the object to use to pick up the object. In some examples, the lift elements forks) of the vehicle may be partially positioned under a side of an object when a signal to pick up the object is received. The local control system of the vehicle may then infer the intent of the remote operator to pick up the object from the side where the lift elements are partially positioned. In another example, a remote operator may instead position the vehicle near an object with the lift elements pointed toward a side of the object to identify the object and the particular side for the local control system to use. In further examples, identifying information may be provided to the local control system of the vehicle from a remote operating system in other ways as well or instead (e.g., an object may be identified for pickup by clicking on an area of a graphical user interface of the remote operating system).

In order to pick up the identified object, the local control system of the vehicle may first determine an approach path toward the object for the vehicle to follow in order to position the vehicle's lift elements under the object. For instance, sensor data from one or more optical sensors on a fork truck may be used to determine a path toward a center point on a side of a pallet under which to insert the truck's forks. The vehicle may then be controlled to move along the path until one or more sensors on the vehicle indicate that the lift elements are fully positioned under object. For instance, a force and/or contact sensor on the body of the vehicle may indicate that the vehicle has contacted the object and the forks are fully inserted. In another example, one or more force sensors on wheels of the vehicle may indicate resistance to movement along the determined path, indicating that the object has been reached. The vehicle may then be stopped and controlled to pick up the object (e.g., by lifting a pallet with its forks).

In further examples, one or more vertical force sensors on the vehicle may also be used to ensure that the object is fully lifted off the ground. For instance, the vehicle may use sensor data from the vertical force sensors to determine a weight of the object. The vehicle may then continue to lift the object higher off the ground until the data from the force sensors indicate that the weight of the object is stable, and therefore that the object has been fully lifted off the ground. In some examples, separate force sensors on each of the forks may also be used to ensure that the weight of the object is distributed evenly across the forks. In further examples, a contact sensor may be used to verify that an object has been lifted as well or instead. In particular, the contact sensor could be positioned at a particular height on the vehicle. The vehicle may then lift the object to the particular height plus an additional distance (e.g., a few inches). Object pickup may then be confirmed by verifying that the contact sensor is no longer in contact with the object.

In additional examples, after determining the approach path toward the object, the local control system of the vehicle may identify a swept space to be covered by the vehicle when moving along the approach path in order to identify any obstacles in the way. If one or more obstacles are identified, the vehicle may refrain from moving toward the object and may send a signal notifying the remote operator. In other examples, the vehicle may adjust the approach path to avoid the one or more obstacles, possibly by directing the vehicle to use a different pickup point on the same side of the object (e.g., an off-center point) or to use a pickup point on a different side of the object. In such examples, the local control system may send a signal to a re e operator identifying the obstacle(s) and requesting confirmation of the planned alternative pickup point or route. Once a return confirmation signal is received, the vehicle may be controlled to move along the alternative path and/or insert the vehicle's lift elements at the alternative pickup point.

In further examples, the approach path and/or the pickup point may be determined based on other factors or different types of input from a remote operator as well or instead. For instance, the autonomous vehicle may receive information indicating a target drop-off location for the object. The autonomous vehicle may then determine the approach path and/or the pickup point on the object in order to accommodate the target drop-off location. For instance, a different side of an object may be used for pickup when using the originally identified side of the object would make dropoff more difficult or impossible based on the size or shape of the target drop-off location.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve au mated loading and/or unloading of boxes and/or other objects, such as into storage containers or to and from delivery vehicles. In some example embodiments, boxes or objects may be automatically organized and placed onto pallets. Within examples, automating the process of loading/unloading, trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
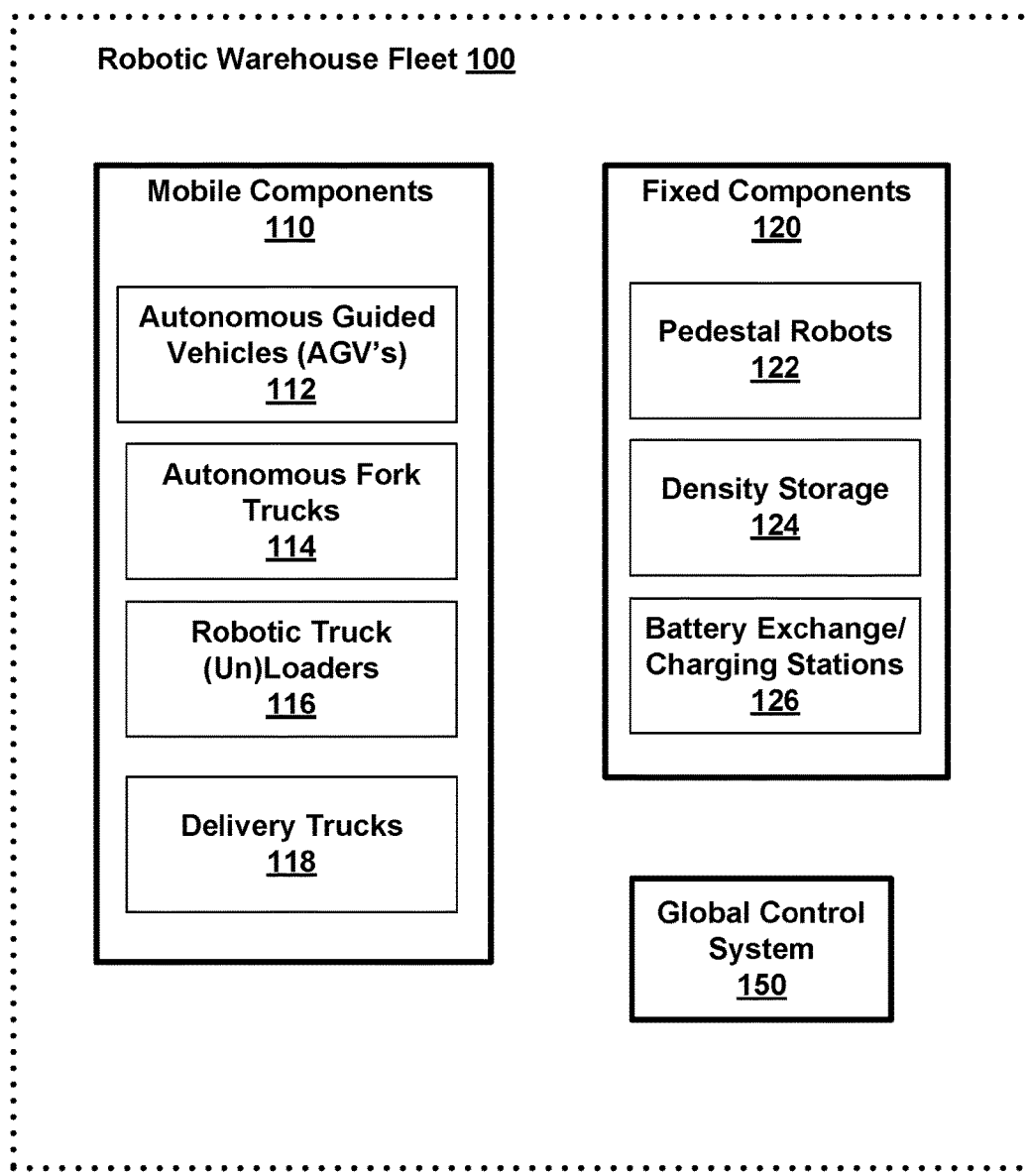
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGVs 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
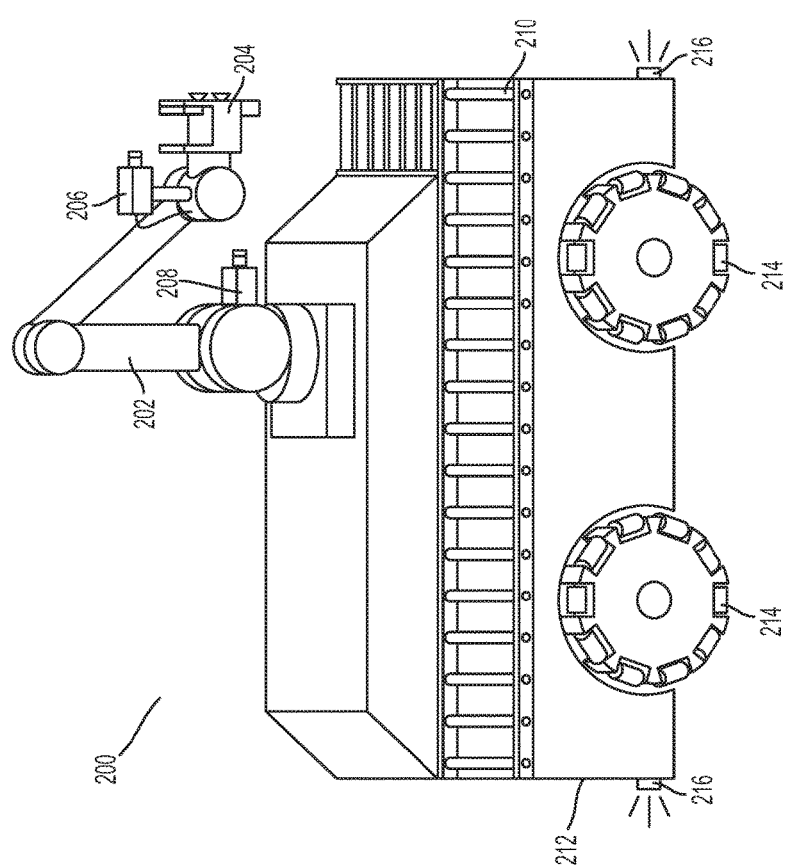
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
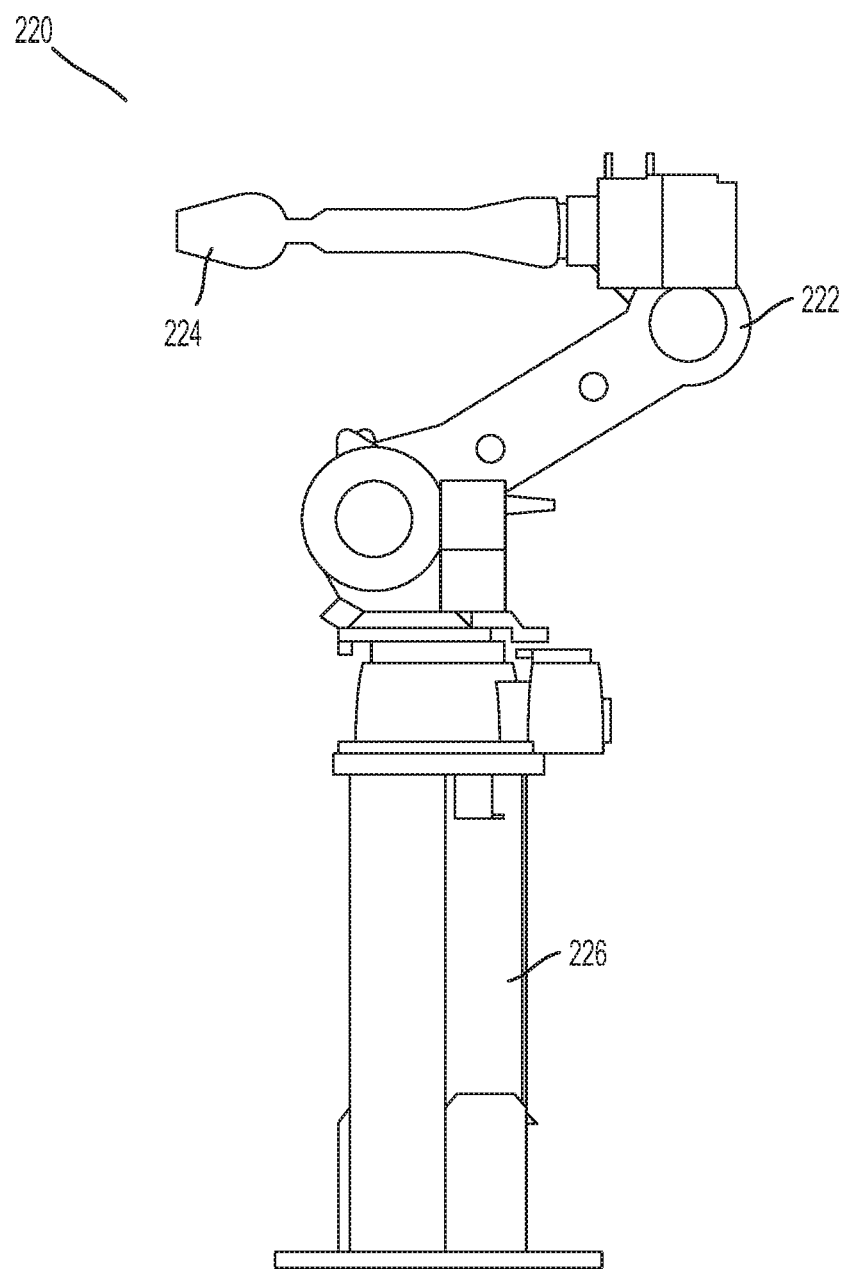
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
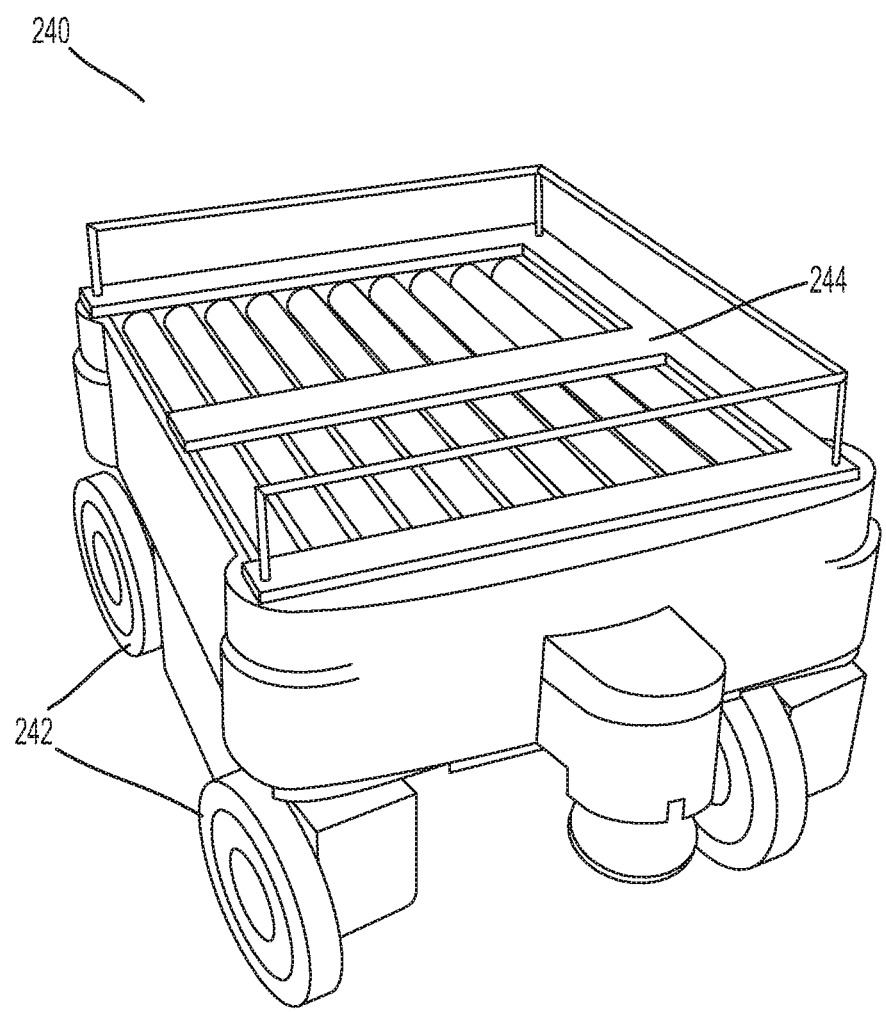
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
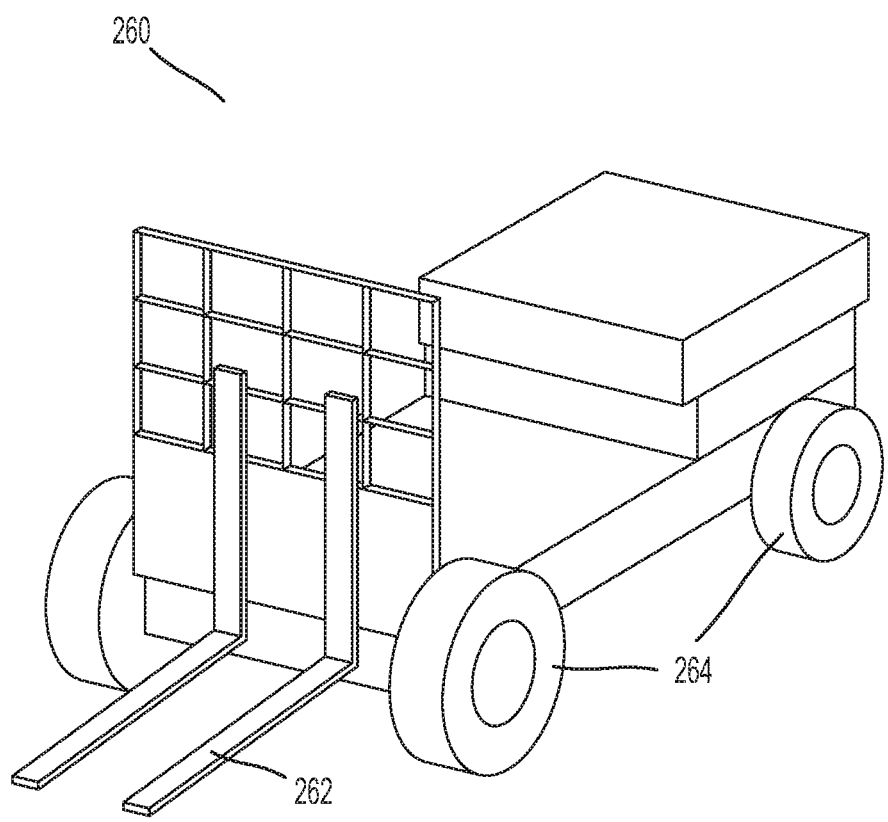
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
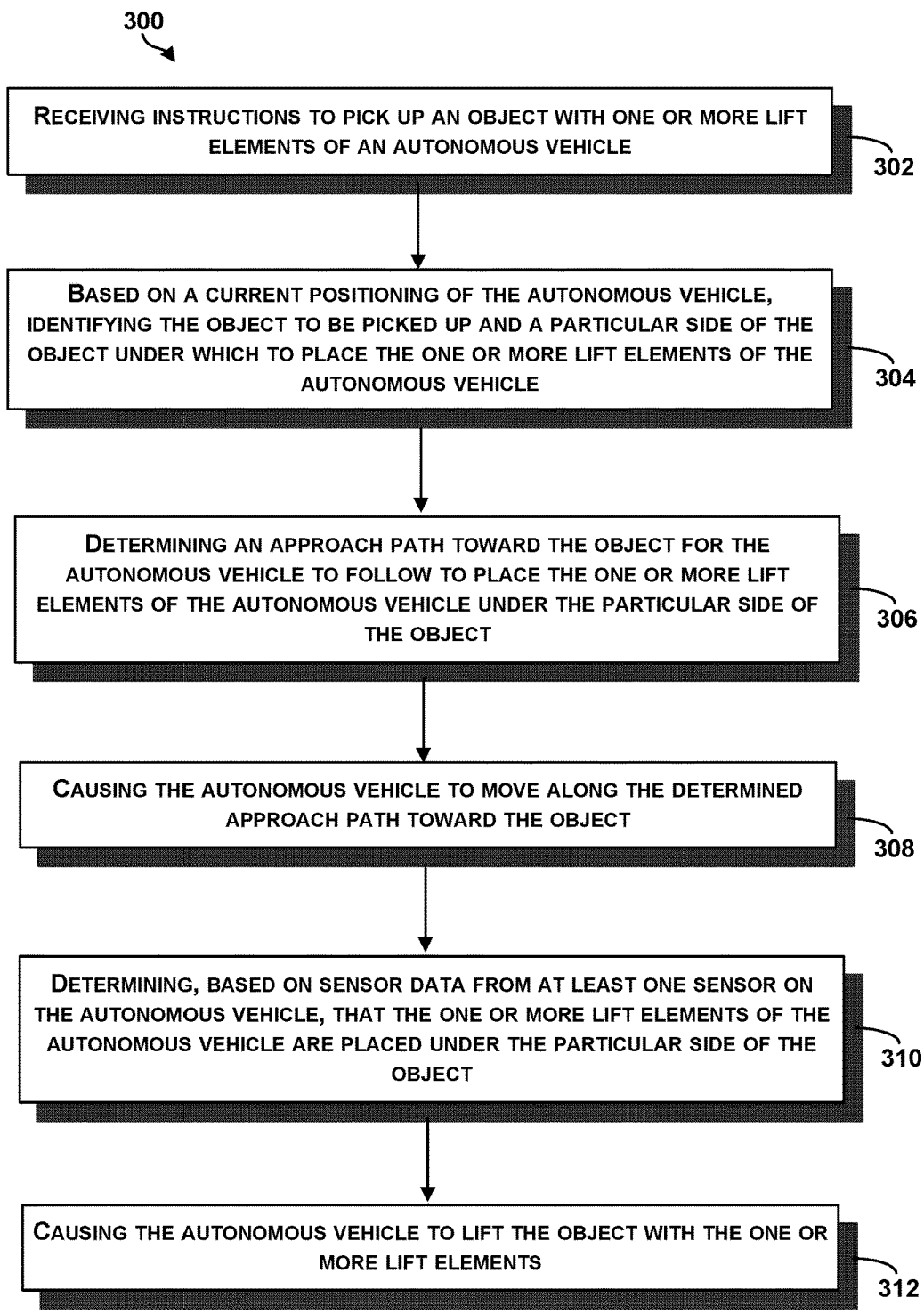
FIG. 3 is a block diagram of a method, according to an example embodiment.

FIG. 3 illustrates a flowchart showing a method 300 that may allow for operation of an autonomous vehicle, according to an example embodiment. Method 300 may be carried out by a local control system of an autonomous vehicle with a lifting component, such as an autonomous fork truck as illustrated and described with respect to FIG. 2D. In further examples, method 300 may be executed by a control system of a number of different possible types of autonomous vehicles, including autonomous forklifts, pallet jacks, or AGVs equipped with one or more lift elements. Additionally, method 300 may involve operation of a different type of mobile robotic device with a lifting mechanism than those devices specially illustrated and described herein.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may involve receiving instructions to pick up an object with one or more lift elements of an autonomous vehicle. Within examples, an autonomous vehicle is a mechanically operable mobile device with at least some functions automated by a local control system of the vehicle. Additionally, the vehicle includes one or more lift elements, which are actuatable components of the vehicle that can be raised in order to lift an object. In some examples, the autonomous vehicle may be an autonomous fork truck with one or more forks (also referred to as "tines" or "prongs"), including a forklift or a pallet jack. In other examples, the autonomous vehicle may be a different type of motorized vehicle besides a truck, such as an AGV. Additionally, the autonomous vehicle may only contain a single lift element (e.g., a single surface) that can be raised in order to lift an object. The object could be any moveable article or container. In some examples, the object may have a certain standardized shape and/or size, such as a pallet of boxes.

Within examples, instructions to pick up an object include any type of digital signal or information that is receivable by the local control system of the vehicle. In some examples, the instructions may simply include a signal to pick up an object without other information identifying the object. In such examples, the local control system of the vehicle may infer which object to pick up or otherwise identify the object based on the current positioning of the hide. The local control system may also use predetermined guidelines regarding types of objects to be picked up. For instance, a pallet jack may have predetermined guidelines to only pick up and move pallets of boxes. In other examples, the instructions may include information to help local control system identify the object to be picked up as well. For instance, the instructions may include the type of object (e.g., a pallet of boxes), a location of the object, or other types of identifying information (e.g., shape, size, color, identification numbers, etc.). In further examples, the instructions may also information indicating how to pick up the object. For instance, the instructions may indicate a pickup point to place forks on the object and/or which side of the object to use to pick up the object.

In some examples, the instructions to pick up an object may be received from a remote operator computing device which sends a digital signal to the local control system of the vehicle. For instance, the remote operator computing device may include a graphical user interface with a selectable option (e.g., a button or menu item) to relinquish control of the vehicle to the local automated system to complete pickup of an object. In some examples, the user interface may also enable communication of other types of information to include in the instructions, such as identification of the object (e.g., by clicking or selecting the object on a screen) and/or what point on the object to use as a pickup point.

In further examples, the instructions to pick up an object may instead be received from a remote automated system. For instance, the instructions could be received from a global control system of a robotic warehouse fleet, such as global control system 150 as described in reference to FIG. 1B. In such examples, the global control system may control the vehicle to navigate close to an object (e.g., using a global map of the environment) to be picked up before transferring control to the local control system for automated final vehicle approach and object pickup.

As shown by block 304 of FIG. 3, method 300 may further involve identifying the object to be picked up based on a current positioning of the autonomous vehicle. Within examples, the current positioning of the vehicle includes the position of the vehicle within an environment at a point in time when the instructions are received, at a point in time when the instructions are sent, or a different point in time proximate to when the instructions are received. By using the current positioning of the vehicle, the local control system may infer the intended object to be picked by a remote operator (e.g., a human remote operator or a remote automated system). Additionally, the local control system may also use the positioning of the vehicle to determine a particular side of the object under which to place the vehicle's lift elements to lift the object. Within examples, the particular side of the object includes a surface of the object, an edge of the object, a point on the object, and/or a direction to approach the object in order to lift the object.

In some examples, a remote operator may partially position one or more of the vehicle's lift elements under the object before relinquishing control of the vehicle to the local control system. The local control system may identify the object to be picked up based on the positioning of the lift elements. In particular, the same side of the object under which the lift elements are partially positioned may be used to lift the object. Knowing that one or more of the lift elements are partially positioned under the object may reduce the space that the local control system must consider to identify where the object to be picked up is, thereby simplifying the task of picking up the object. In some examples, if one or more of the lift elements are not positioned under an object when the instructions are received, the local control system may refrain from attempting to pick up an object, and may instead return control to the remote operator.

Figure 4A:
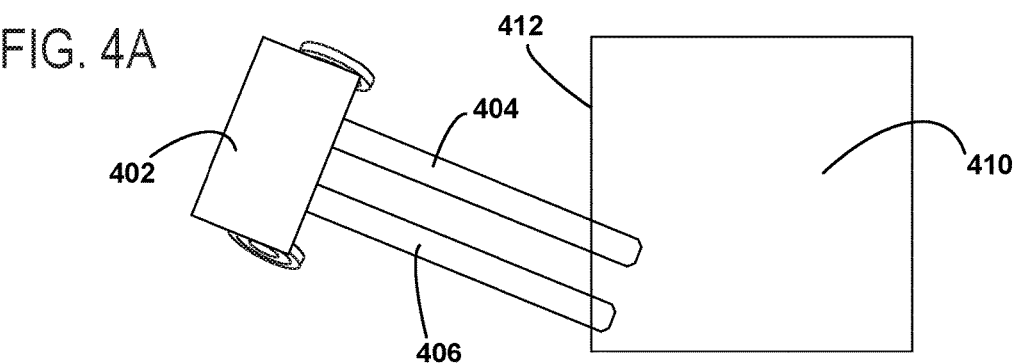
FIGS. 4A, 4B, and 4C illustrate an automated approach sequence for a pallet jack, according to an example embodiment.

FIG. 4A illustrates partial positioning of a vehicle's lift elements under an object, according to an example embodiment. More specifically, the forks 404, 406 of a pallet jack 402 may be partially positioned under a particular side 412 of a pallet 410 when the instructions to pick up an object are received by a local control system of the pallet jack 402. Based on this positioning, the local control system of the pallet jack 402 may identify the pallet 410 as the object to be picked and the side 412 of the pallet 410 to use for the pickup. As is discussed in more detail below, the local control system may then cause the pallet jack 402 to move toward the pallet 410 to fully insert the forks 404, 406 under the particular side 412 of the pallet 410 in order to pick up the pallet 410.

The local control system of a vehicle may use the current positioning of the vehicle to identify the object in other ways as well or instead. For instance, the local control system may determine if the lift elements of the vehicle are pointed at a particular object. If so, then the particular object may be identified as the object to be picked up by the vehicle. In another example, the direction that the front of the vehicle is facing may be used instead of the direction of the lift elements. In a further example, the local control system may determine whether there is an object within a certain threshold distance from the vehicle. If there is a single object within the threshold distance from the vehicle, then that object may be identified as the object to be picked up by the vehicle. In additional examples, a combination of different types of information may be used by the local control system to identify an object for pickup. For instance, the local control system may only proceed with object pickup if the is directed at a particular object and the object is within a threshold distance as well.

Referring back to FIG. 3, the method 300 may further involve determining an approach path toward the object for the vehicle to follow to place one or more of the vehicle's lift elements under the object, as shown by block 306. More specifically, after determining a side of the object to use for pickup, the local control system may determine a route for the vehicle to follow towards the object in order to align and position the vehicle's lift elements for pickup. In some examples, the approach path may be determined in order to place the lift elements at a center point of the particular side of the object (e.g., the middle of a side of a pallet). The center point may be determined based on sensor data from one or more optical sensors on the vehicle that are oriented to detect the object.

Figure 4B:
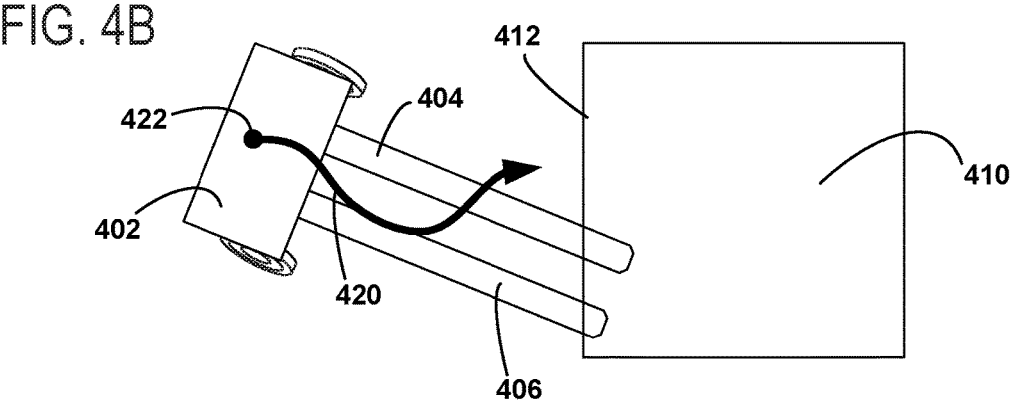

FIG. 4B illustrates an approach path toward an object, according to an example embodiment. More specifically, the local control system of pallet jack 402 may determine approach path 420 for the pallet jack 402 to move along in order to place the forks 404, 406 of the pallet jack 402 under the pallet 410. The approach path 420 may start at a current positioning 422 of the pallet jack 402. Additionally, the approach path 420 may not have a predetermined endpoint because force feedback from one or more force sensors on the pallet jack 402 may be used to determine when to stop motion of the pallet jack 402 along the path 420. In some examples, the approach path 420 may be determined over time as pallet jack 402 moves along the path 420 and more sensor data (e.g., from one or more optical sensors) becomes available.

The approach path 420 may be determined in order to line up the pallet jack 402 with the pallet 410 so that the forks 404, 406 of the pallet jack 402 are perpendicular to the side 412 of the pallet 410 when inserted under the pallet 410. Determination of the path 420 may therefore take into account the current positioning and orientation of the pallet jack 402 as well as the current positioning and orientation of the forks 404, 406 in order to properly align the pallet jack 402 for pickup. In some examples, the path 420 may be determined to place the forks 404, 406 under a center point of the side 412 of the pallet 410. In other examples, the path 420 may be determined to place the forks 404, 406 at a different pickup point on the pallet 410 as well.

Referring back to FIG. 3, method 300 may further involve causing the vehicle to move along the determined approach path toward the object, as shown by block 308. More specifically, the local control system may cause the vehicle to navigate along the path toward the object. In some examples, the path may be adjusted or refined as the vehicle moves along the path. For instance, navigation adjustments may be applied in an effort to align the lift elements of the vehicle so that they are perpendicular to a side of a pallet when inserted under the pallet. Additionally, navigation adjustments may be applied in an effort to align the lift elements of the vehicle so that they are placed under a center point on a side of the pallet. In some examples, this type of fine navigation control may be difficult for a remote operator (e.g., due to network delay in visualizing the effects of navigation adjustments). Accordingly, the local control system may be capable of more precise navigation with direct access to optical sensing data from the vehicle.

In further examples, the local control system of the vehicle may also adjust the speed of the vehicle in moving along the determined approach path toward the object. For instance, the local control system may cause the vehicle to slow down as it gets closer to the object. Precise speed control may be difficult for a remote operator, and there may be a risk of contacting the object with too much speed. Additionally, a remote operator may attempt to compensate by causing the vehicle to slow down well in advance of reaching the object. In contrast, the local control system of the vehicle may not reduce speed until the vehicle is proximate to the object, which may produce efficiency gains from using the local control system for object pickup as well.

Method 300 may further involve determining that one or more of the vehicle's lift elements are placed under the object for pickup, as shown by block 310. More specifically, the local control system of the vehicle may use force feedback from one or more force sensors on the vehicle to determine when the vehicle's lift elements are properly positioned under the object. As is discussed in more detail below, a force sensor may be any type of sensor placed on the vehicle's lift elements, wheels, and/or body that are configured to detect force, contact, and/or pressure from the object. Other types of sensors, such as distance sensors and/or optical sensors, may be used to ensure that the vehicle's lift elements are positioned under the object as well or instead. Based on sensor data from these sensors, the local control system may determine when to stop the vehicle's motion along the determined approach path. In one example, the local control system may determine when a detected force exceeds a threshold amount, and responsively cause the vehicle to stop motion along the path.

Figure 4C:
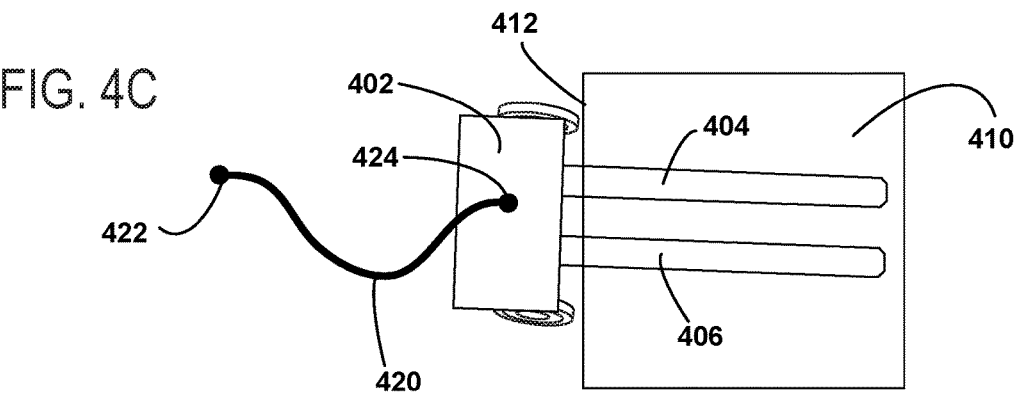

FIG. 4C shows a vehicle at the end of an approach path, according to an example embodiment. More specifically, the pallet jack 402 may be controlled to move from starting position 422 along approach path 420 until it reaches point 424. When the pallet jack 402 reaches point 424, sensor data from one or more forces sensors on the pallet jack 402 may indicate that the forks 404, 406 are fully positioned under the pallet 410. For instance, one or more contact sensors on the body of the pallet jack 402 may detect contact with the pallet 410. As another example, one or more sensors on the wheels of the pallet jack 402 may detect that the pallet jack 402 is experiencing a resistive force when moving along the approach path 420. As previously discussed, the pallet jack 402 may be controlled to move slowly enough as it gets close to the pallet 410 to avoid damaging the pallet 410 or pallet jack 40 upon contact. When to slow down the pallet jack 402 and/or stop the pallet jack 402 may be determined at least in part using sensor data from one or more optical sensors on the pallet jack 402.

In some examples, a remote operator may have a difficult time stopping the vehicle immediately after contact with the object is detected. A local control system of the vehicle with force sensors may have direct access to force feedback data in order to stop the vehicle as soon as force and/or contact is detected.

Referring back to FIG. 3, method 300 may further involve causing the vehicle to lift the object with the one or more lift elements, as shown by block 312. More specifically, after navigating the vehicle in order to place the lift elements under the object, the lift elements may be raised in order to lift the object off the ground. In some examples, control of the vehicle may be returned to a remote operator after object pickup is complete.

Figure 5A:
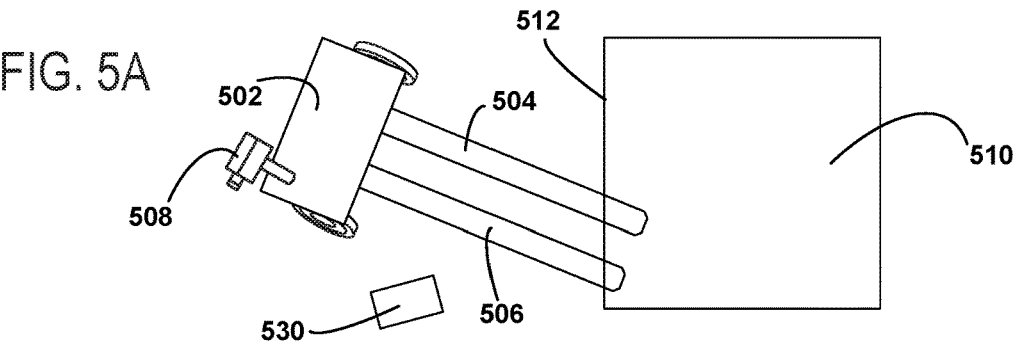
FIGS. 5A, 5B, and 5C illustrate another automated approach sequence for a pallet jack, according to an example embodiment.

FIG. 5A illustrates another example of partial positioning of a vehicle's lift elements under an object, according to example embodiment. More specifically, the forks 504, 506 of a pallet jack 502 may be partially positioned under a particular side 512 of a pallet 510 when instructions to pick up the pallet are received by a local control system of the pallet jack 502. Additionally, the pallet jack 502 may be equipped with at least one optical sensor 508 that is configured to detect other objects in an area around the pallet jack 502. For instance, the local control system of the pallet jack 502 may identify object 530 based on sensor data from optical sensor 508. In some examples, nearby objects may identified using sensor data from at least one laser scanner on the vehicle that is configured to scan an area surrounding the vehicle. In other examples, nearby objects may be identified in other ways as well or instead. For instance, one or more different types of sensors on pallet jack 502 may be used. In further examples, sensor data may also be received from other robotic devices operating in the environment and/or sensors fixed within the environment as well.

Figure 5B:
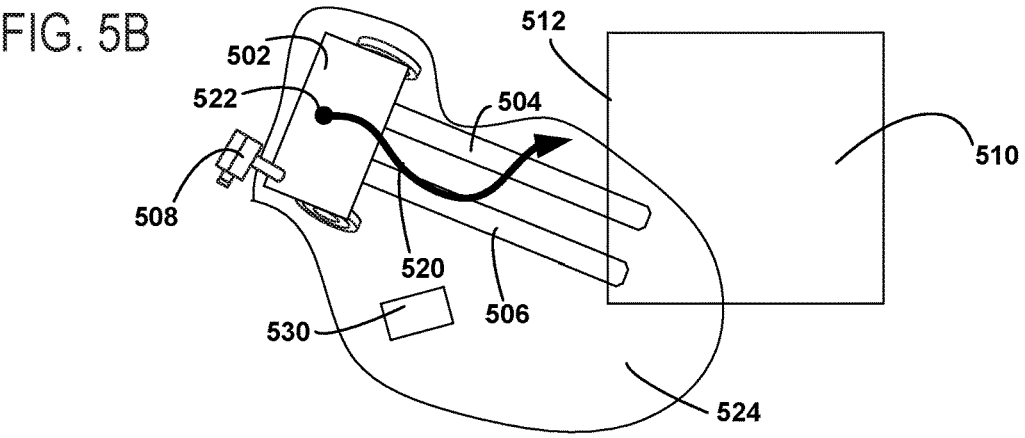

FIG. 5B illustrates an approach path toward an object and a swept space, according to an example embodiment. More specifically, the local control system of pallet jack 502 may determine an approach path 520 toward pallet 510 in order to cause the pallet jack 502 to move from starting position 522 toward the side 512 of the pallet 510. The approach path 520 may be determined in order to align the forks 504, 506 of pallet jack 502 in order to pick up the pallet 510. For instance, as discussed in references to FIGS. 4A, 4B, and 4C, the approach path 520 may be determined in order to insert the forks 504, 506 perpendicular to the side 512 of the pallet 510 at an approximate center point of the side 512 of the pallet 510.

Additionally, the local control system of pallet jack 502 may determine a swept space 524 to be covered by the pallet jack 502 in moving along approach path 520. Within examples, the swept space 524 includes an area of the environment that some part of the pallet jack 502 will occupy at some point in moving along approach path 520. In additional examples, the swept space 524 may also include some additional buffer around the area crossed by the pallet jack 502. In further examples, the swept space 524 may be determined or adjusted over time as the pallet jack 502 moves along the path 520 and/or more sensor data becomes available.

The local control system of pallet jack 502 may determine whether there are any objects and/or other types of potential obstructions within swept space 524. For instance, object 530 may be identified as an obstacle within swept space 524. In response to detecting object 530, the local control system of pallet jack 502 may determine or adjust the approach path to avoid the object 530. For instance, a new approach path may be determined with a swept space that does not include object 530. In some examples, it may not be possible for the vehicle to approach the object for pickup at the planned pickup point on the object. In such examples, the local control may send a signal warning the remote operator, and then relinquish control of the vehicle without completing the pickup.

In some examples, the local control system may determine that a different pickup point on the same side of the object can be reached without colliding with the obstructing object. For instance, in reference to FIG. 5B, it may be determined that pallet jack 502 can pick up the pallet 510 at a different pickup point on side 512 of pallet 510 besides the center point. In such examples, the local control system may determine an alternative approach path for the vehicle to reach the alternative pickup point. In additional examples, the local control system may also send a signal to the remote operator identifying the obstructing object and the proposed alternative pickup point on the object. The local control system may then wait for a confirmation signal from the remote operator before proceeding with the pickup. For instance, the remote operator may confirm that the proposed alternative pickup point is acceptable given type, size, shape, or other properties of the object.

Figure 5C:
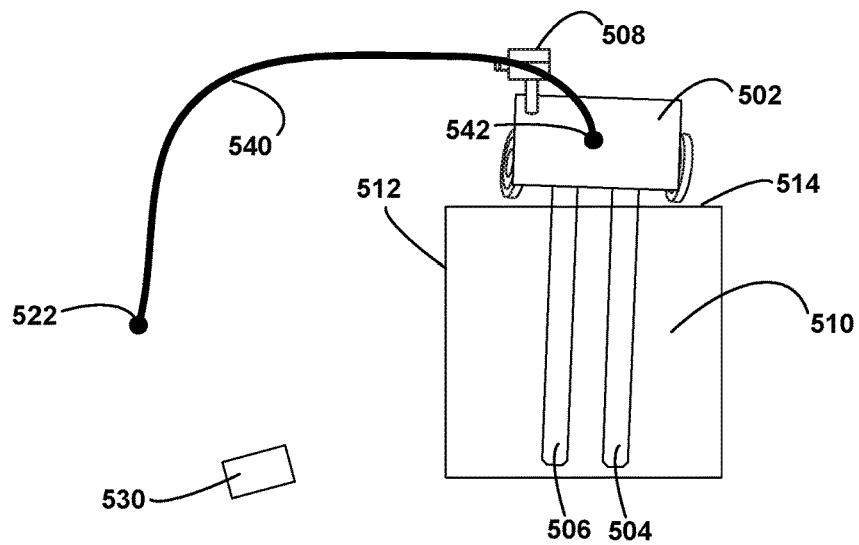

FIG. 5C shows an alternative approach path toward a different side of an object, according to an example embodiment. More specifically, the local control system of pallet jack 502 may determine that picking up the pallet 510 on side 512 is not feasible because of object 530. Accordingly, the local control system may determine an alternative approach path 540 to reach a different side 514 of the object 510. As with using a different pickup point, the local control system of the pallet jack 502 may first send a signal to the remote operator identifying the obstacle and the proposed alternative side to use to pick up the object. The vehicle 502 may not be controlled to move along alternative approach path 540 toward side 514 of the pallet 510 until a confirmation signal is received. After moving the vehicle 502 along path 540, the local control system may use force feedback data from one or more force sensors on the vehicle 502 in order to cause the vehicle to stop at point 542 to pick up the pallet 510 from side 514 with forks 504, 506.

In further examples, alternative pickup points and/or alternative sides to pick up an object from may be determined based on other factors besides obstructing obstacles. In some examples, the local control system may determine or receive information regarding a target dropoff location for an object after it is picked up by the vehicle. Based on characteristics of the target dropoff location such as shape, size, or current capacity, a pickup point or side for the object may be determined in order to accommodate the dropoff location. For instance, it may be determined that an object must be picked up on a particular side in order for the vehicle to be able to deliver it to the target location. Confirmation may also be requested from a remote operator in order to use the particular side for pickup.

Figure 6:
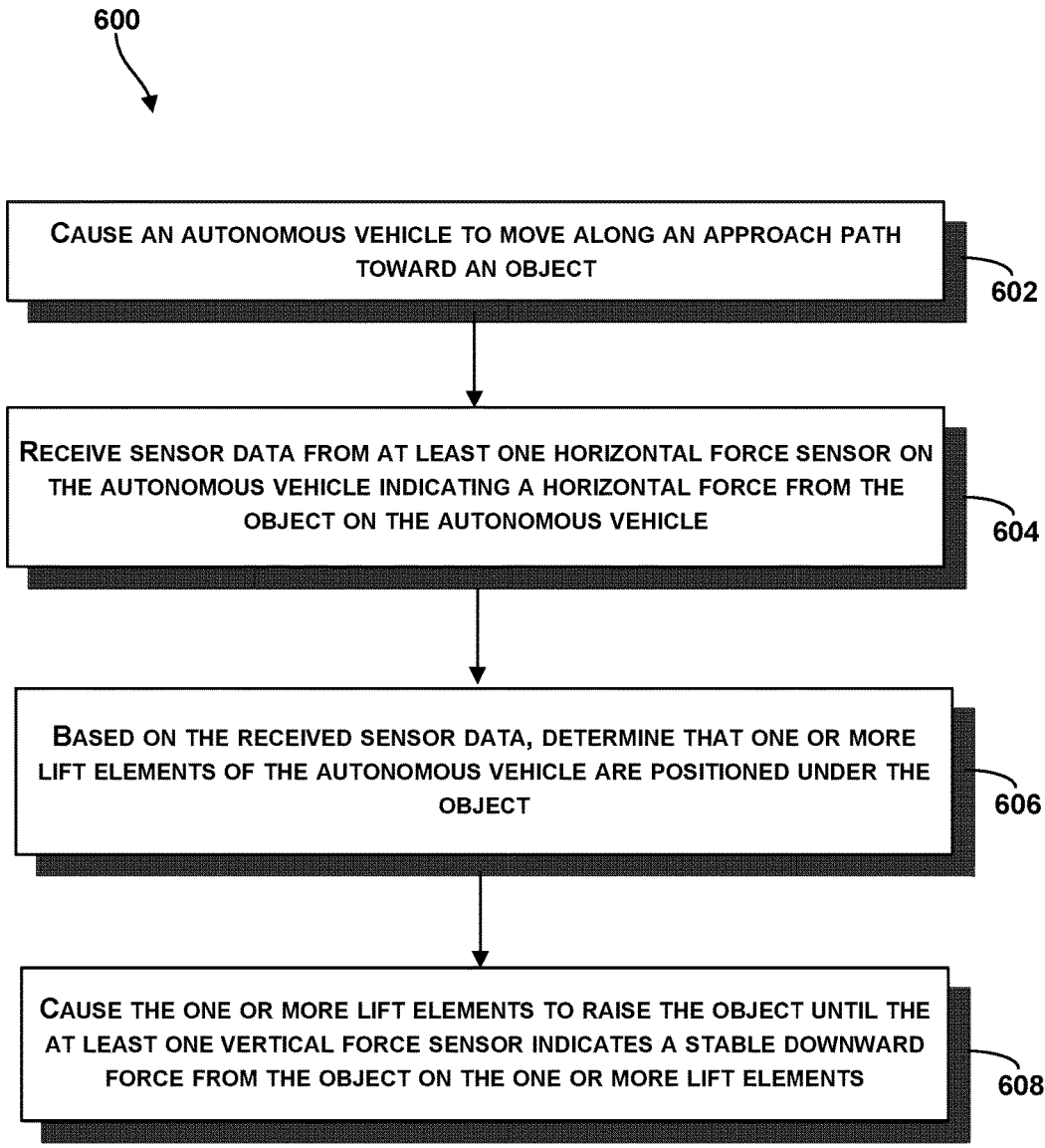
FIG. 6 is another block diagram of a method, according to an example embodiment.

FIG. 6 illustrates a flowchart showing another method 600 that may allow for operation of an autonomous vehicle, according to an example embodiment. Method 600 may be carried out by a local control system of an autonomous vehicle with a lifting component, including any of the types of vehicles described in reference to method 300 of FIG. 3. Additionally, all of the possible modes of operation and/or implementation described in reference to method 300 of Figure may be applied to method 600 of FIG. 6 as well.

As shown by block 602 of FIG. 6, method 600 includes causing an autonomous vehicle to move along an approach path toward an object. The approach path indicates a path for the vehicle to follow in order to place lift elements such as forks of the vehicle under the object for object pickup. In some examples, the approach path may be determined by a local control system of the autonomous vehicle, as described in reference to method 300 of FIG. 3. In other examples, the approach path may instead be determined by a remote operating system (e.g., a remote automated system or a remote human-operated system) and then sent to the local control system of the vehicle for execution.

As shown by block 604 of FIG. 6, method 600 further includes receiving sensor data from at least one horizontal force sensor on the autonomous vehicle indicating a horizontal force from the object on the autonomous vehicle. Within examples, a horizontal force sensor is a sensor positioned on the vehicle in order to detect force toward the vehicle in a direction opposite the direction of travel of the vehicle. In some examples, one or more horizontal force sensors may be contact sensors on the body of the vehicle that detect contact between the body of the vehicle and an object when the lift elements of the vehicle are fully positioned under the object. In additional examples, one or more horizontal force sensors may be force sensors coupled to one or more wheels of the vehicle to detect resistive force opposite the approach path followed by the vehicle. In further examples, one or more horizontal force sensors may be positioned on the lift elements or elsewhere on the vehicle as well or instead.

Figure 7A:
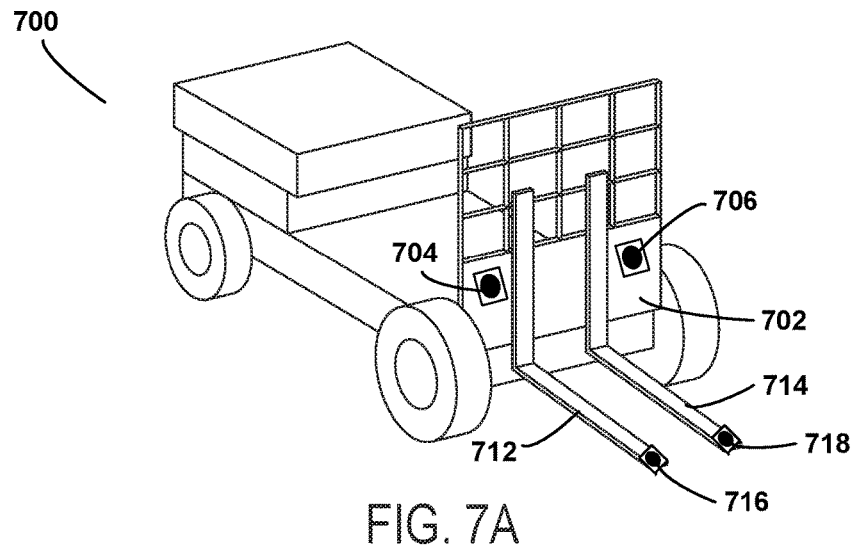
FIGS. 7A and 7B illustrate an autonomous fork truck with force sensors, according to an example embodiment.

FIG. 7A illustrates an autonomous vehicle with horizontal force sensors and vertical force sensors, according an example embodiment. More specifically, fork truck 700 includes two horizontal force sensors 704, 706 mounted to the body 702 of the fork truck 700. The horizontal force sensors 704, 706 may generate sensor data indicating a force on the fork truck 700 in a direction towards the front of the body 702 of the fork truck 700. The sensor data may include force values, pressure values, and/or a boolean value indicating whether or not contact with an object is detected. Multiple horizontal force sensors may be arranged on a vehicle in order to verify that the vehicle's lift elements are fully positioned under an object to be picked up. In some examples, horizontal force sensors may be positioned elsewhere on the body 702, on the forks 712, 714, on the wheels, and/or on other parts of fork truck 700 as well or instead.

Referring back to FIG. 6, method 600 further involves determining that one or more lift elements of the autonomous vehicle are positioned under the object, as shown by block 606. More specifically, the vehicle may be moved toward the object until sensor data from one or more of the force sensors indicates a horizontal force from the object on the vehicle in a direction opposite the approach path. In some examples, the horizontal force may simply be any detected contact between the object and the vehicle. For instance, a horizontal force sensor may be a contact or bump sensor positioned on the front of the vehicle's body. In further examples, determining that the lift elements of the vehicle are properly positioned under the object may involve determining that multiple horizontal force sensors on the vehicle have indicated a force and/or contact from the object. It may also involve determining that the registered forces are uniform in magnitude at different points on the vehicle to verify that the lift elements are aligned under the object to be picked up.

Figure 7B:
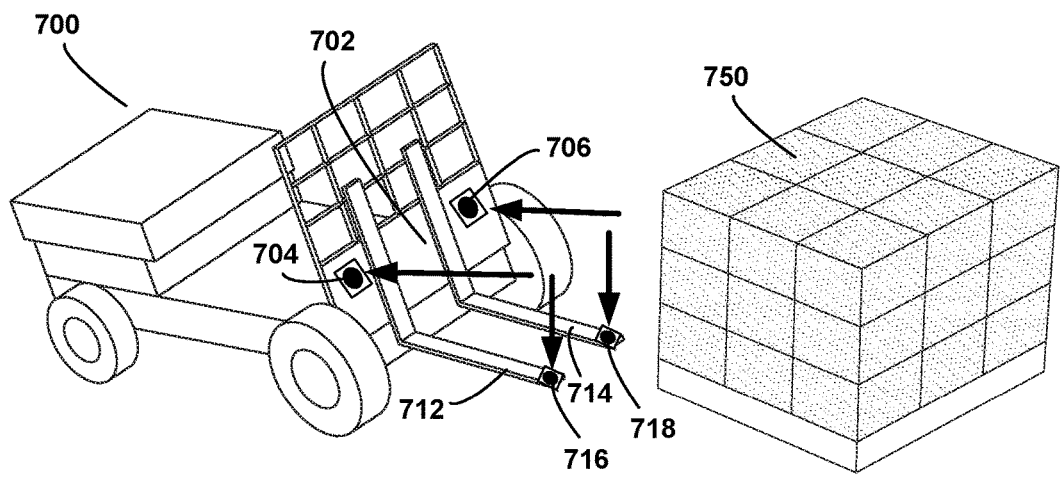

FIG. 7B shows the vehicle from FIG. 7A and an object to be picked up, according to an example embodiment. More specifically fork truck 700 may be advanced along an approach path toward pallet 750 in order to pick up the pallet 750. The fork truck 700 may be controlled to move toward the object until one or both of the horizontal force sensors 704, 706 detect a horizontal force from the pallet 750 on the body 702 of the fork truck 700. The arrows toward horizontal force sensors 704, 706 in FIG. 7B indicate directions of force on the fork truck 700 from the pallet 750 that may be detected by the horizontal force sensors 704, 706. In some examples, the fork truck 700 may be advanced until both horizontal force sensors 704, 706 detect a force from the pallet 750. In further examples, the fork truck 700 may be advanced until both horizontal force sensors 704, 706 indicate a force of the same magnitude from the pallet 750, or two forces within a threshold amount from one another.

Referring back to FIG. 6, method 600 may further involve causing the one or more lift elements to raise the object until at least one vertical force sensor indicates a stable downward force from the object on the one or more lift elements, as shown by block 608. More specifically, after the vehicle has been moved into position so that the lift elements are fully positioned under the object, the lift elements may be raised to lift the object off the ground. One or more force sensors on at least one of the lift elements may be used to detect downward force from the object. The object may be raised until the detected downward force remains stable to ensure that the object is fully lifted off the ground (e.g., that an edge or other portion of the object is not still on the ground). In some examples, a weight of the object may be determined using sensor data from the vertical force sensors. The vehicle may continue to lift the object until the determined weight no longer changes, or is stable to within some threshold amount. Within examples, ensuring that the object is fully lifted off the ground before allowing the vehicle to move with the object may avoid damage that could result from dragging the object on the ground.

In reference to FIG. 7A, fork truck 700 may include vertical force sensors 716, 718 positioned on each of the vehicle's forks 712, 714. The vertical force sensors 716, 718 may indicate a downward force detected on each of the respect forks 712, 714. For instance, in reference to FIG. 7B, when the pallet 750 is lifted by the forks 712, 714, the vertical force sensors 716, 718 may each detect downward vertical forces as reflected by the arrows shown. The pallet 750 may be lifted by the forks 712, 714 until the vertical force sensors 716, 718 indicate a stable downward force and/or stable weight from the pallet 750. In some examples, the vertical force sensors may be positioned at different points on a vehicle's lift elements than shown here. Additionally, multiple vertical force sensors may be positioned at different points on a single lift element as well.

In some examples, data from respective force sensors on different lift elements may be used to determine whether an object's weight is sufficiently distributed across the lift elements. For instance, in FIG. 7B, data from the vertical force sensors 716, 718 may be used to determine how the weight of the pallet 750 is distributed across forks 712, 714. If the weight is not balanced across the forks 712, 714 (e.g., to within some threshold amount from equal weight distribution), the fork truck 700 may be controlled to set the pallet 750 back on the ground and not proceed with the pickup. In further examples, a local control system of the fork truck 700 may determine an alternative pickup point and/or side to pick up the pallet 750 in an effort to provide more equal distribution of the weight of the pallet 750 across the forks 712, 714 as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A vehicle, comprising:
   one or more lift elements on a side of the vehicle;
   at least one horizontal force sensor configured to detect a horizontal force in a direction toward the side of the vehicle;
   at least one vertical force sensor configured to detect a downward force on the one or more lift elements; and
   a local control system configured to:
   receive instructions from a remote control system of the vehicle to cause the vehicle to autonomously approach and lift an object;
   cause the vehicle to move along an approach path toward the object;
   based on sensor data from the at least one horizontal force sensor indicating a horizontal force from the object on the vehicle, determine that the one or more lift elements are positioned under the object;
   after determining that the one or more lift elements are positioned under the object, cause the one or more lift elements to raise the object;
   based on sensor data from the at least one vertical force sensor indicating a stable downward force from the object on the one or more lift elements, determine that the object is lifted off of a ground surface; and
   after determining that the object is lifted off of the ground surface, return control of the vehicle to the remote control system.

2. The vehicle of claim 1, wherein the at least one horizontal force sensor comprises at least one contact sensor on a body of the vehicle that is configured to detect contact between the body of the vehicle and the object.

3. The vehicle of claim 1, wherein the at least one horizontal force sensor comprises a horizontal force sensor coupled to a wheel of the vehicle, wherein the horizontal force sensor coupled to the wheel is configured to detect the horizontal force from the object on the vehicle based on a horizontal force on the wheel of the vehicle.

4. The vehicle of claim 1, wherein:
   the one or more lift elements comprise a first lift element and a second lift element;
   the at least one vertical force sensor comprises a first vertical force sensor configured to detect a vertical force on the first lift element and a second vertical force sensor configured to detect a vertical force on the second lift element; and
   the local control system is further configured to use sensor data from the first vertical force sensor and the second vertical force sensor to determine where to place the first lift element and the second lift element under the object in order to distribute a weight of the object over the first lift element and the second lift element.

5. The vehicle of claim 1, wherein the local control system is further configured to:
   determine that the horizontal force from the object on the vehicle exceeds a threshold amount; and
   responsively cause the vehicle to stop moving along the approach path toward the object.

6. The vehicle of claim 1, wherein the at least one horizontal force sensor comprises a first horizontal force sensor and a second horizontal force sensor, and wherein the local control system is further configured to:
   determine that registered forces from the object on the vehicle at the first horizontal force sensor and the second horizontal force sensor are uniform in magnitude; and
   based on determining that the registered forces are uniform in magnitude, verify that the one or more lift elements are aligned under the object.

7. The vehicle of claim 1, further comprising a contact sensor at a first height on the vehicle, wherein the local control system is configured to:
   cause the one or more lift elements to raise the object to a second height above the first height; and
   based on determining that the contact sensor is no longer in contact with the object, confirm that the object is lifted off of the ground surface.

8. The vehicle of claim 1, further comprising at least one laser scanner configured to detect objects within an area surrounding the vehicle, wherein the local control system is further configured to:
   identify, based on sensor data from the at least one laser scanner, one or more additional objects within the area surrounding the vehicle; and
   determine the approach path toward the object for the vehicle to follow in order to avoid contact between the vehicle and the one or more additional objects.

9. The vehicle of claim 1, further comprising at least one optical sensor coupled to the vehicle, wherein the local control system is further configured to:
   determine, based on sensor data from the at least one optical sensor, a center point of a side of the object; and
   determine the approach path toward the object for the vehicle to follow to place the one or more lift elements of the vehicle under the center point of the side of the object.

10. The vehicle of claim 1, further comprising at least one optical sensor coupled to the vehicle, wherein the local control system is further configured to:
    determine, based on sensor data from the at least one optical sensor, a center point of a side of the object;
    determine that an approach path to place the one or more lift elements under the center point of the side of the object would cause contact between the vehicle and one or more additional objects; and
    determine the approach path toward the object for the vehicle to follow to place the one or more lift elements of the vehicle under an alternative point of the side of the object that is different from the center point in order to avoid contact between the vehicle and the one or more additional objects.

11. The vehicle of claim 10, wherein the local control system is further configured to:
    send a signal indicating the one or more additional objects and the alternative point of the side of the object;
    receive a confirmation signal confirming pickup of the object at the alternative point of the side of the object; and
    cause the vehicle to move along the determined approach path in response to receiving the confirmation signal.

12. The vehicle of claim 1, wherein the local control system is further configured to:
    determine an area of swept space to be covered by the vehicle when moving along the approach path toward the object;
    identify one or more additional objects within the area of swept space; and
    adjust the approach path toward the object for the vehicle to follow in order to avoid contact between the vehicle and the one or more additional objects.

13. The vehicle of claim 1, wherein the local control system is further configured to:
    determine at least one future destination for the vehicle to move with the object;
    select a pickup point on a side of the object to accommodate the at least one future destination; and
    determine the approach path toward the object for the vehicle to follow to place the one or more lift elements of the vehicle under the selected pickup point on the side of the object.

14. A method comprising:
    receiving instructions from a remote control system of a vehicle to cause the vehicle to autonomously approach and lift an object;
    causing the vehicle to move along an approach path toward an object;
    based on sensor data from at least one horizontal force sensor on the vehicle indicating a horizontal force from the object on the vehicle, determining that one or more lift elements of the vehicle are positioned under the object;
    after determining that the one or more lift elements are positioned under the object, causing the one or more lift elements of the vehicle to raise the object;
    based on sensor data from at least one vertical force sensor on the vehicle indicating a stable downward force from the object on the one or more lift elements of the vehicle, determining that the object is lifted off of a ground surface; and
    after determining that the object is lifted off of the ground surface, returning control the vehicle to the remote control system.

15. The method of claim 14, further comprising using sensor data from a first vertical force sensor on a first lift element and sensor data from a second vertical force sensor on a second lift element to determine where to place the first lift element and the second lift element under the object in order to distribute a weight of the object over the first lift element and the second lift element.

16. The method of claim 14, further comprising:
    determining an area of swept space to be covered by the vehicle when moving along the approach path toward the object;
    identifying one or more additional objects within the area of swept space; and
    adjusting the approach path toward the object for the vehicle to follow in order to avoid contact between the vehicle and the one or more additional objects.

17. The method of claim 14, further comprising:
    determining that the horizontal force from the object on the vehicle exceeds a threshold amount; and
    responsively causing the vehicle to stop moving along the approach path toward the object.

18. The method of claim 14, further comprising:
- determining, based on sensor data from at least one optical sensor on the vehicle, a center point of a side of the object;
- determining that an approach path to place the one or more lift elements under the center point of the side of the object would cause contact between the vehicle and one or more additional objects; and
- determining the approach path toward the object for the vehicle to follow to place the one or more lift elements of the vehicle under an alternative point of the side of the object that is different from the center point in order to avoid contact between the vehicle and the one or more additional objects.

19. The method of claim 14, wherein the at least one horizontal force sensor comprises a first horizontal force sensor and a second horizontal force sensor, and wherein the method further comprises:
- causing the vehicle to move along the approach path toward the object until the first horizontal force sensor and the second horizontal force sensor detect forces having magnitudes within a threshold amount from one another.

20. A non-transitory computer readable medium having stored therein instructions, that when executed by a control system of an autonomous vehicle, cause the control system to perform functions comprising:
- receiving instructions from a remote control system of a vehicle to cause the vehicle to autonomously approach and lift an object;
- causing the vehicle to move along an approach path toward an object;
- based on sensor data from at least one horizontal force sensor on the vehicle indicating a horizontal force from the object on the vehicle, determining that one or more lift elements of the vehicle are positioned under the object;
- after determining that the one or more lift elements are positioned under the object, causing the one or more lift elements of the autonomous vehicle to raise the object;
- based on sensor data from at least one vertical force sensor on the vehicle indicating a stable downward force from the object on the one or more lift elements of the vehicle, determining that the object is lifted off of a ground surface; and
- after determining that the object is lifted off of the ground surface, returning control the vehicle to the remote control system.

* * * * *